(12) United States Patent
Harris

(10) Patent No.: US 7,686,255 B2
(45) Date of Patent: Mar. 30, 2010

(54) SPACE VEHICLE HAVING A PAYLOAD-CENTRIC CONFIGURATION

(75) Inventor: Mark A. Harris, Clearwater, FL (US)

(73) Assignee: Raytheon Company, Waltham, MA (US)

( * ) Notice: Subject to any disclaimer, the term of this patent is extended or adjusted under 35 U.S.C. 154(b) by 226 days.

(21) Appl. No.: 11/845,825

(22) Filed: Aug. 28, 2007

(65) Prior Publication Data
US 2009/0057492 A1 Mar. 5, 2009

(51) Int. Cl.
*B64G 1/10* (2006.01)
(52) U.S. Cl. .............. 244/159.5; 244/159.4; 244/172.6; 244/172.7; 343/915
(58) Field of Classification Search .............. 244/159.4, 244/159.5, 172.6, 172.7
See application file for complete search history.

(56) References Cited

U.S. PATENT DOCUMENTS

| | | | | |
|---|---|---|---|---|
| 3,174,397 | A * | 3/1965 | Sanborn | 359/853 |
| 3,496,687 | A * | 2/1970 | Greenberg et al. | 52/109 |
| 4,375,878 | A * | 3/1983 | Harvey et al. | 244/173.1 |
| 4,384,692 | A * | 5/1983 | Preukschat | 244/158.1 |
| 5,314,146 | A * | 5/1994 | Chicoine et al. | 244/173.1 |
| 5,518,209 | A * | 5/1996 | Chicoine et al. | 244/159.4 |
| 5,642,122 | A | 6/1997 | Lockie et al. | |
| 5,680,145 | A * | 10/1997 | Thomson et al. | 343/915 |
| 5,864,324 | A * | 1/1999 | Acker et al. | 343/915 |
| 6,028,570 | A * | 2/2000 | Gilger et al. | 343/915 |
| 6,150,995 | A * | 11/2000 | Gilger | 343/915 |
| 6,225,965 | B1 * | 5/2001 | Gilger et al. | 343/915 |
| 6,323,827 | B1 * | 11/2001 | Gilger et al. | 343/915 |

(Continued)

FOREIGN PATENT DOCUMENTS

EP 0 780 304 A 6/1997

(Continued)

OTHER PUBLICATIONS

Notification of Transmittal of the International Search Report and the Written Opinion of the International Searching Authority, or the Declaration; PCT/US2008/072046 dated Apr. 14, 2009.

(Continued)

*Primary Examiner*—Michael R Mansen
*Assistant Examiner*—Justin Benedik
(74) *Attorney, Agent, or Firm*—Daly, Crowley, Mofford & Durkee, LLP

(57) ABSTRACT

In one aspect, a space vehicle includes a structure configured to expand from a first configuration to a second configuration and at least two equipment compartments attached to the periphery of the structure. The structure includes at least one of an antenna mesh, a light-shielding mesh, an optical reflector mesh and a net.

In another aspect, a space vehicle includes an antenna structure configured to expand from a first configuration to a second configuration and at least two equipment compartments attached to the periphery of the antenna structure. At least one of the at least two equipment components include a solar panel, a propulsion system and an antenna feed.

In a further aspect, a space vehicle includes a payload element and at least two spacecraft-support structures attached to the periphery of the payload element. At least one of the at least two spacecraft-support structures includes a propulsion system and a tracking, telemetry and control system.

28 Claims, 11 Drawing Sheets

U.S. PATENT DOCUMENTS 6,978,966 B2 * 12/2005 Wang et al. ................ 244/3.21
7,020,076 B1 * 3/2006 Alkalai et al. ............... 370/217
2005/0209835 A1 9/2005 Ih

FOREIGN PATENT DOCUMENTS

| EP | 0 823 374 A | 2/1998 |
| EP | 1 168 497 | 1/2002 |
| FR | 2 667 299 A | 4/1992 |

OTHER PUBLICATIONS

Written Opinion of the International Searching Authority; PCT/US2008/072046 dated Apr. 14, 2009.

* cited by examiner

SPACE VEHICLE HAVING A PAYLOAD-CENTRIC CONFIGURATION

BACKGROUND

Satellites implement many applications by using radio frequency (RF) communications to establish a link between an in-orbit payload and ground stations on Earth, for example, sensor and communications applications. Sensor applications use RF signals radiated from and received by the satellite to perform functions such as to detect weather, winds, temperature, and other earth science parameters. Communications applications include telecommunications relay services between earth terminals as well as telemetry and commands between the satellite and its payload and the ground controller. There are advantages in sensor and communication applications to having as large an antenna aperture as possible. For example, larger antenna apertures permit lower satellite transmitter output power to achieve the same ground RF power flux density, allow the satellite receiver to detect signals from lower power, more mobile ground transmitters, and reduce the antenna spot beam size to provide services over more concentrated areas, to reduce interference region size, and to permit more detailed earth science measurements over smaller regions.

In one particular example, if antenna gain is expressed as:

$$G = \eta \left( \frac{\pi D}{\lambda} \right)^2,$$

where
 η=Antenna efficiency
 D=Antenna diameter
 and λ=Wavelength, then increasing the diameter of the antenna aperture by a factor of four increases the gain by sixteen times, or 12 dB. The larger antenna aperture provides an equivalent communications service with one-sixteenth the transmitter power on the satellite, reducing heat, size, mass, primary power, and cost. Alternately, the same transmitter power can support sixteen times the data rate with equivalent bit error rate performance. The larger antenna aperture also allows the ground terminal uplink power to be reduced by a factor of sixteen, reducing heat and battery size or allows the ground terminal antenna to be reduced in size to increase mobility and provide communications on the move. Therefore, a larger antenna aperture provides an advantage to a satellite communications system.

Generally, satellites are deployed in space using launch vehicles (e.g., rockets). Generally, the satellite is stowed within a fairing located as a top portion of the launch vehicle. A fairing is a structure that produces a smooth aerodynamic outline to reduce drag from air resistance. Once in space where there is no air to cause resistance, the fairing separates from the launch vehicle, freeing the satellite to deploy and maneuver to a stable orbit position.

The cost of launching a satellite is a major contributor to program costs, and the cost rises with the size (in particular the diameter) and mass of the satellite. Similarly, the satellite diameter generally increases with the size of the payload antenna aperture. A means of implementing a large aperture in the satellite deployed state while minimizing the stowed size thus minimizes the system cost while not sacrificing performance capability and has significant value.

SUMMARY

In one aspect, a space vehicle includes a structure configured to radially expand from a first configuration to a second configuration and at least two equipment compartments attached to the periphery of the structure. The structure is at least one of an antenna mesh, a light-shielding mesh, an optical reflector mesh and a net.

In another aspect, a space vehicle includes an antenna structure configured to radially expand from a first configuration to a second configuration and at least two equipment compartments attached to the periphery of the antenna structure. At least one of the at least two payload components include a solar panel, a propulsion system and an antenna feed.

In a further aspect, a space vehicle includes a payload element and at least two spacecraft-support structures attached to the periphery of the payload element. At least one of the at least two spacecraft-support structures includes a propulsion system and a tracking, telemetry and control system.

DETAILED DESCRIPTION

Mission effectiveness for space-based systems is highly influenced by the size of an antenna aperture; however larger antenna apertures tend to drive a traditionally designed space vehicle into a larger launch vehicle. Unlike prior alt approaches, described herein is a space vehicle configuration that inverts the current spacecraft-support-centric configuration, for example, a satellite with antenna appendages, to a payload-centric configuration, for example, a larger antenna-aperture structure at the center of the satellite with spacecraft support functions attached to the antenna-aperture structure. The payload-centric approach allows for a larger antenna aperture to be launched from a smaller launch vehicle than the launch vehicle required for the satellite having the vehicle-support-centric configuration. As the central element in the configuration, the large stowed antenna-aperture structure efficiently consumes the central volume of the launch vehicle fairing, and the spacecraft-support functions are attached to the periphery of the antenna-aperture structure. When launched, the antenna-aperture structure deploys and the spacecraft-support components separate and surround the key functional element: the antenna-aperture structure.

Described herein is a satellite with the spacecraft-support functions such as attitude determination and control, propulsion, electrical power, command and data handling, and tracking, telemetry and command services, for example, distributed among at least two equipment compartments attached to the periphery of a payload element, for example, an antenna-aperture structure. Even though a satellite is described in this description, the concepts described herein may be applied to any space vehicle. As used herein a space vehicle includes a payload and the spacecraft support elements. In general, the spacecraft support elements transport and guide the space vehicle to deliver the payload. The payload defines the purpose of the space vehicle. For example, the antenna aperture defines a purpose of a communications satellite.

Figure 1A:
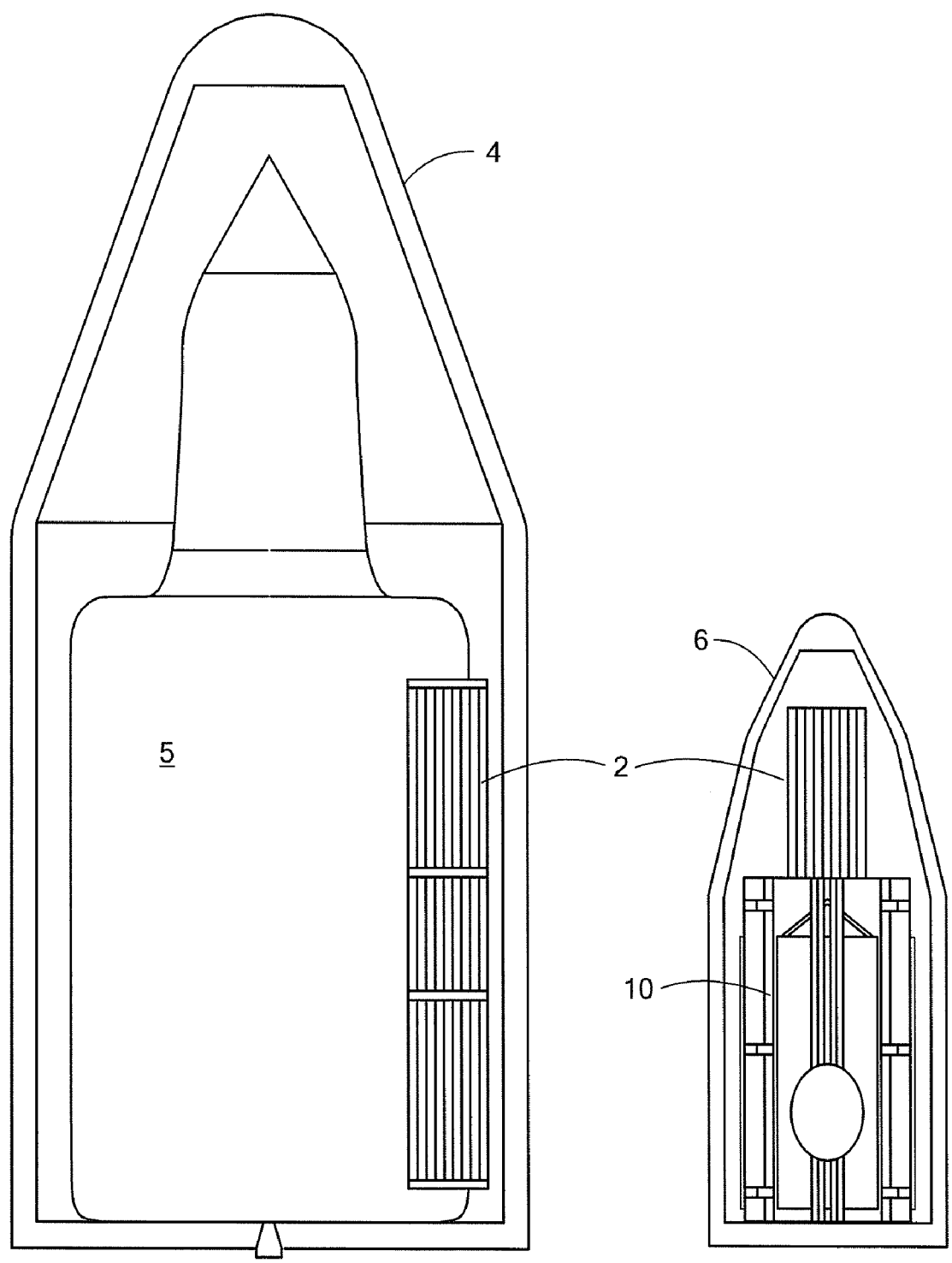
FIG. 1A is a view of two different sized fairings with a respective stored satellite.
Figure 1B:
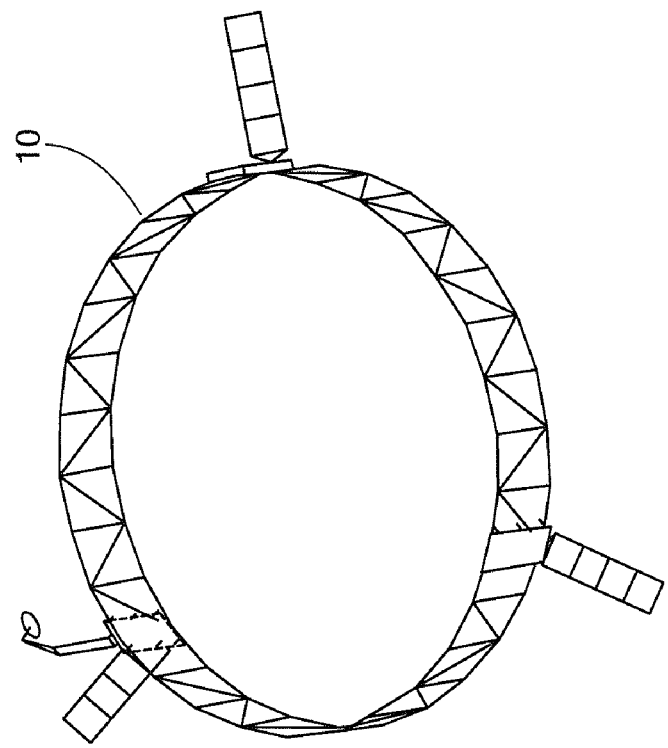
FIG. 1B is a view of a deployed satellite having a payload-centric configuration and a satellite having a spacecraft centric configuration.
Figure 1B:
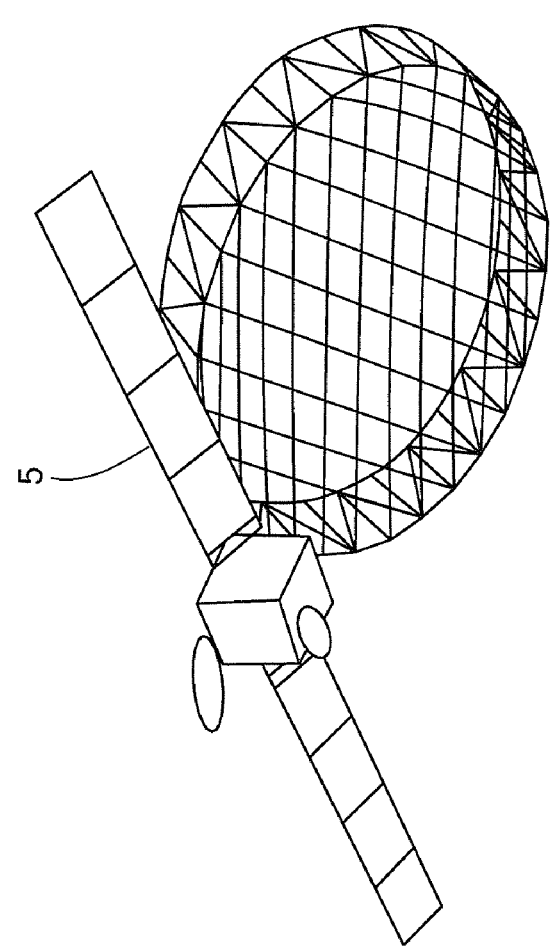

For example, in FIGS. 1A and 1B, using a twenty-meter antenna aperture 2, the prior art approach required a 144.7-inch diameter fairing 4 of a Expandable Evolvable Launch Vehicle (EELV) costing $125M to launch a spacecraft-centric satellite 5 while the approach described herein may be launched with a much smaller 80.9-inch diameter fairing 6 of a Taurus or Minotaur launch vehicle costing $42M to launch a payload-centric satellite 10, resulting in an $80M savings per satellite. Thus, the approach described herein provides a smaller deployable satellite that provides a larger antenna aperture at greatly reduced cost to build and launch than previously prior art methods.

Figure 3:
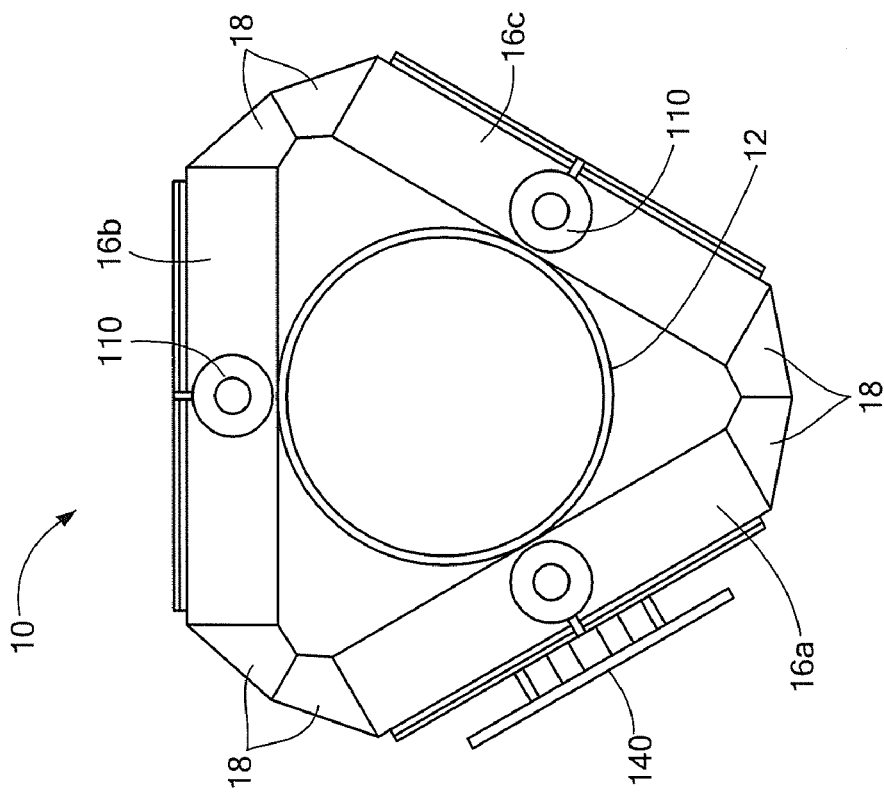
FIGS. 2 to 4 are various views of a stowed configuration of a satellite.
Figure 2:
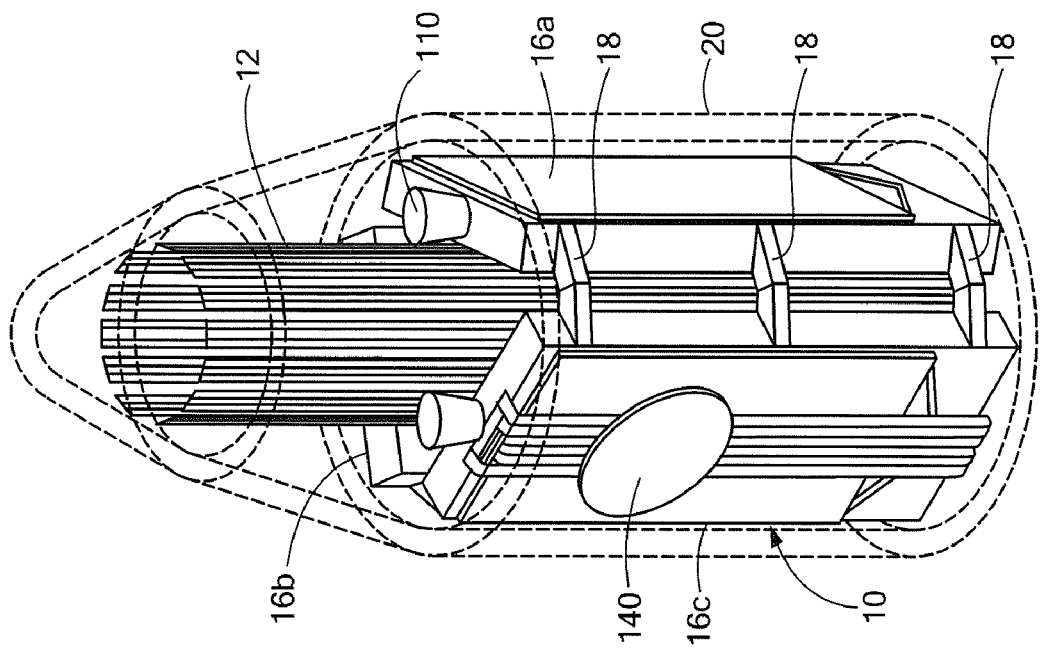
Figure 4:
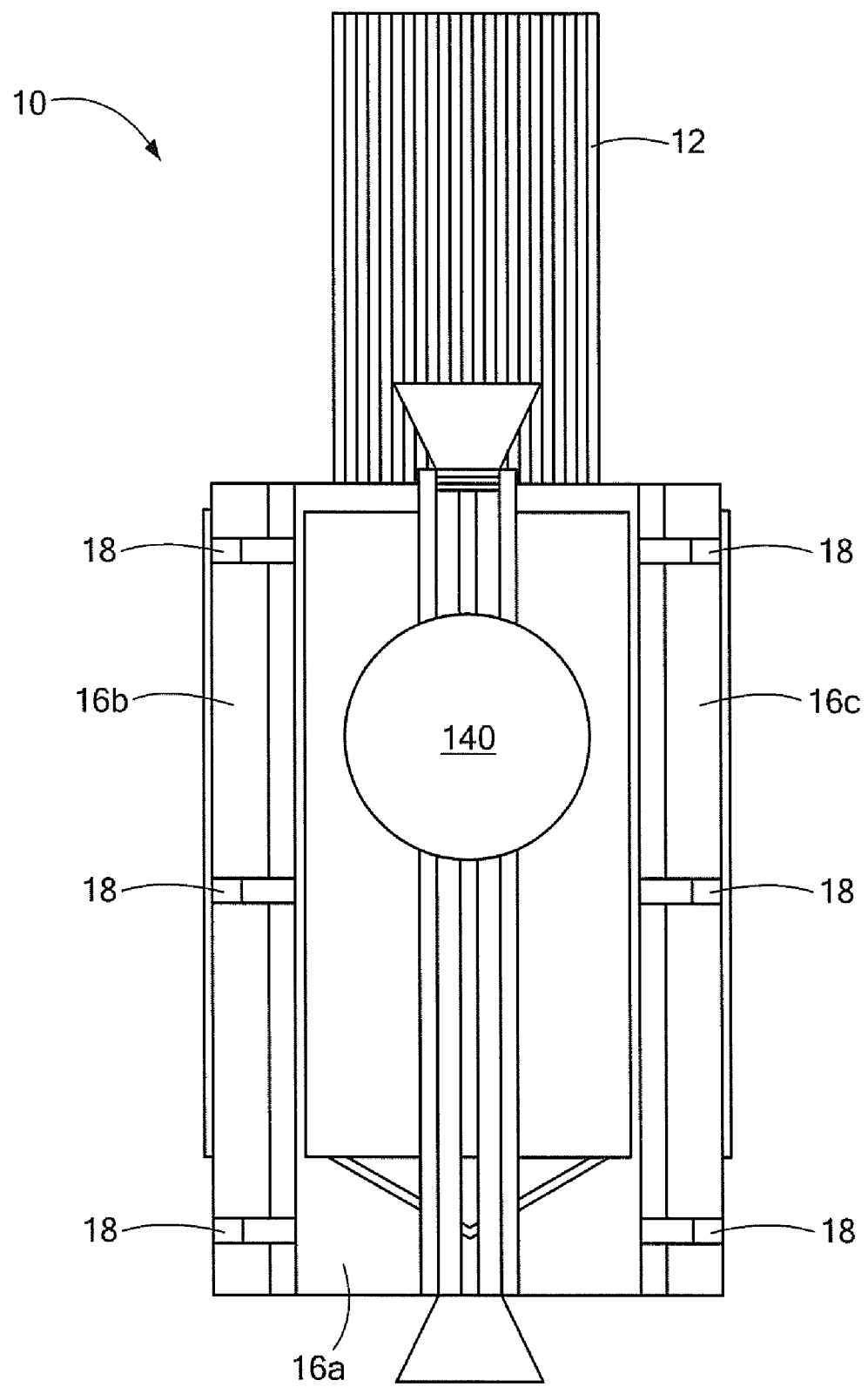

Referring to FIGS. 2 to 4, the satellite 10 is shown in a stowed configuration within a protective fairing of a launch vehicle (e.g., a fairing 20 is shown in dotted lines in FIG. 1A). In one example, the spacecraft 10 includes an antenna-aperture structure 12 and three equipment compartments (e.g., an equipment compartment 16a, an equipment compartment 16b and an equipment compartment 16c) attached to and surrounding the antenna-aperture structure 12. Each of the three equipment compartments 16a-16c is physically connected together to two other equipment compartments at the edges for stability during launch by a series of explosive bolts connecting structures 18. In one example, each equipment compartment 16a-16c has six bolt structures 10, three on each side of the equipment compartment. Even though three equipment compartments 16a-16c are described herein, any number of two or more equipment compartments may be implemented in the spacecraft 10. In one example, using the Taurus/Minotaur fairing constraints, the equipment compartments 16a-16c are 3.09×1.31×0.26 meters, which is compatible with typical spacecraft support functions and payload components built for satellites today.

Figure 5:
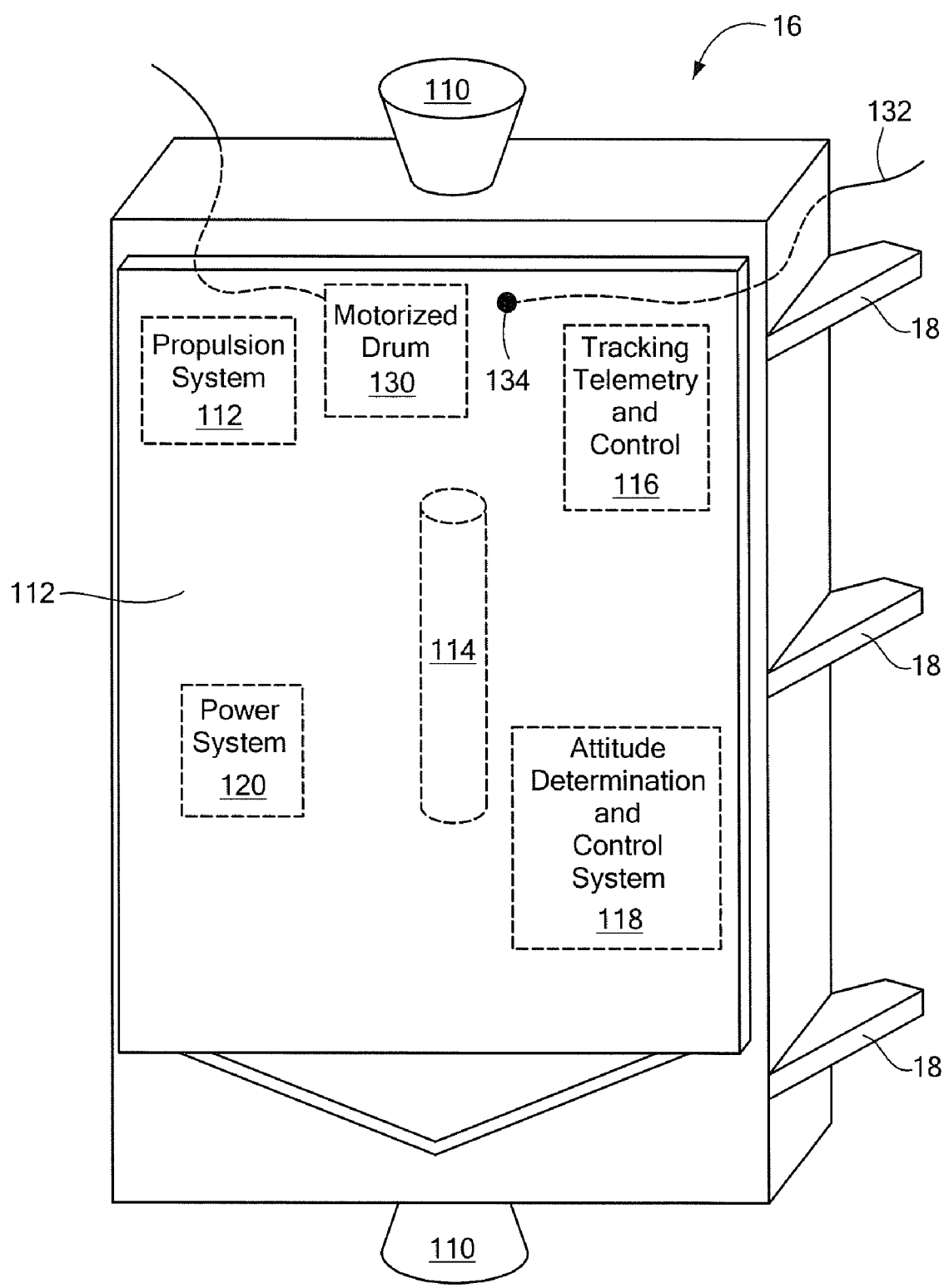
FIG. 5 is view of one embodiment of an equipment compartment of the satellite.

Referring to FIG. 5, each equipment compartment 16a-16c is a basic lightweight honeycomb panel with spacecraft support functions and payload elements attached The equipment compartments 16a-16c provide structural integrity as well as thermal control and shielding for the attached components. In one example, the equipment compartments 16a-16c include thrusters 110, a propulsion system 112 controlling the thrusters, a fuel tank 114 to power the thrusters, a power system 120 and solar arrays 122. One or more of the equipment compartments 16a-16c include a tracking, telemetry and control (TT&C) system 116 and an attitude determination and control (ADC) system 118. One of the equipment compartments 16a-16c includes a drum motor 130 attached to a cable 132 which is secured at one end 134 to the equipment compartment. As described below, the motorized drum 130 and the cable 132 are used to deploy the antenna-aperture structure 12.

Since the propulsion system 112 and the ADC system 118 are distributed among the three equipment compartments 16a-16c, the thrusters 110 in the equipment compartments maintain a desired plane of the spacecraft 10 relative to a pointing target when deployed. Propulsion system 112 and fuel tanks 114 are sized to fit within the volume of the equipment compartments 16a-16c. The fuel tanks 114 use smaller tanks than typically used; however, since the fuel is distributed across the three equipment compartments 16a-16b, sufficient volume is available.

In one example, the TT&C system 116 is placed in one of the equipment compartments 16a-16c. The TT&C system 116 receives communications from ground control to command the spacecraft 10 and responds with health and status information as it is launched, deployed, and operated. The TT&C system 116 also provides tracks the satellite position. These commands and telemetry messages are distributed to the spacecraft and payload functions via the command and data handling system that communicates with each subsystem via spacecraft wiring and interconnections between equipment compartments housed within the antenna-aperture structure or via low power local radio (i.e., wireless) signals.

The ADC system 118 maintains the orientation of the satellite 10. For example, the ADC system 10 may be used to orient the satellite 10 to point to a target so that it may be used more effectively to transmit/receive signals using the antenna mesh structure 12.

The power system 120 includes voltage regulators, battery chargers, and batteries (not shown) to power the satellite 10 and to store solar power received from the solar arrays 122. In one example, the solar arrays 122 are each 0.86×4.88 meters and each of the three arrays provides over 1000 watts (typical of an end of life value for triple junction cells in low earth orbit, ignoring possible shading effects), which is sufficient power for most payloads because of the high-gain antenna being implemented. Other solar panel configurations are possible to provide more or less equipment power as needed.

Figure 9:
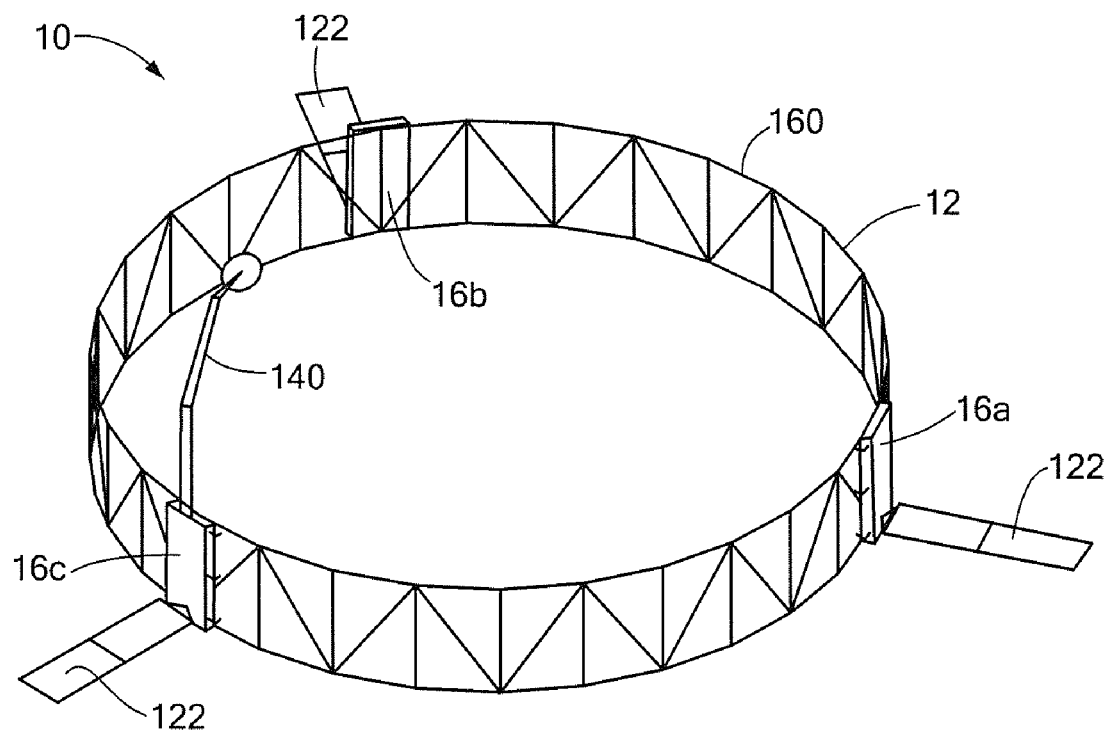
FIGS. 9 to 11 are various views of a fully expanded configuration of the satellite.
Figure 10:
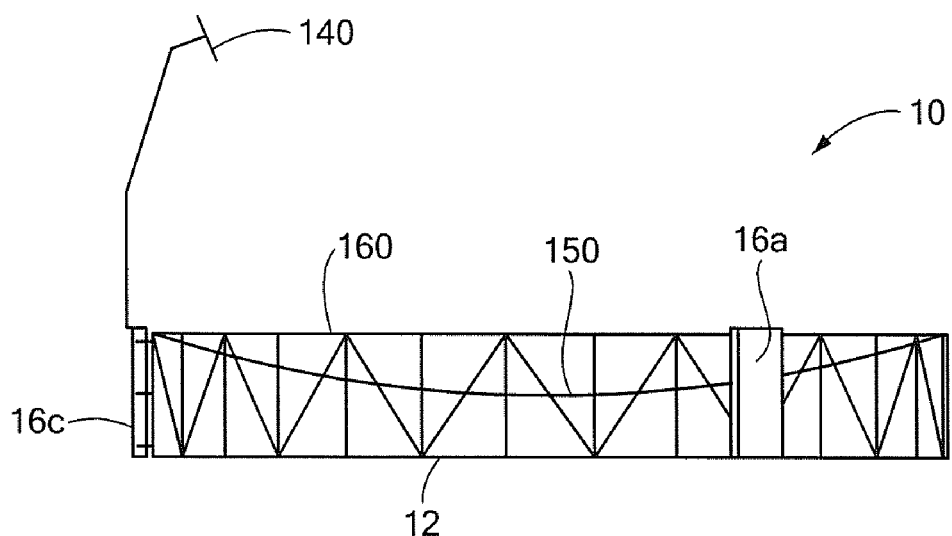
Figure 11:
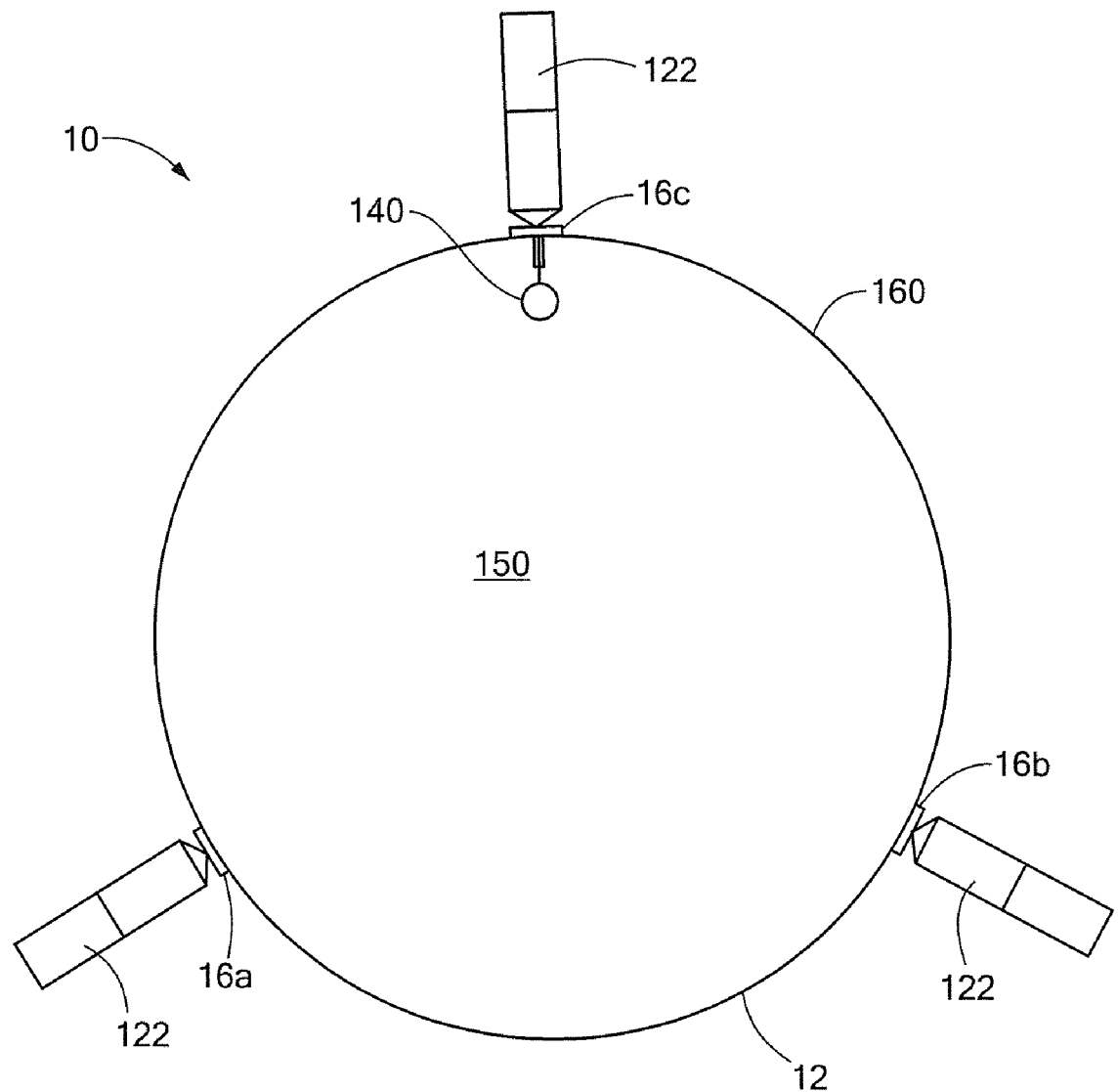

In one example, an equipment compartment 16c (as shown in FIGS. 9 to 11) includes a communications payload incorporating receive and transmit functions that connect to the antenna feed 140 (FIGS. 9 to 11). Radio frequency (RF) uplink signals from transmitting ground terminals are intercepted and reflected from the antenna mesh structure 150 and focused on the antenna feed 140. The large diameter of the reflector mesh 150 forms the aperture size that captures more uplink RF energy than a smaller aperture, contributing to the effectiveness of this system. The captured uplink signals are amplified and frequency translated by the receiver and transmitter payload components, returned to the antenna feed 140 and radiated towards the antenna mesh reflector 150. The downlink signals are reflected from the mesh reflector 150 back towards the earth to the receiving ground terminal.

Figure 6:
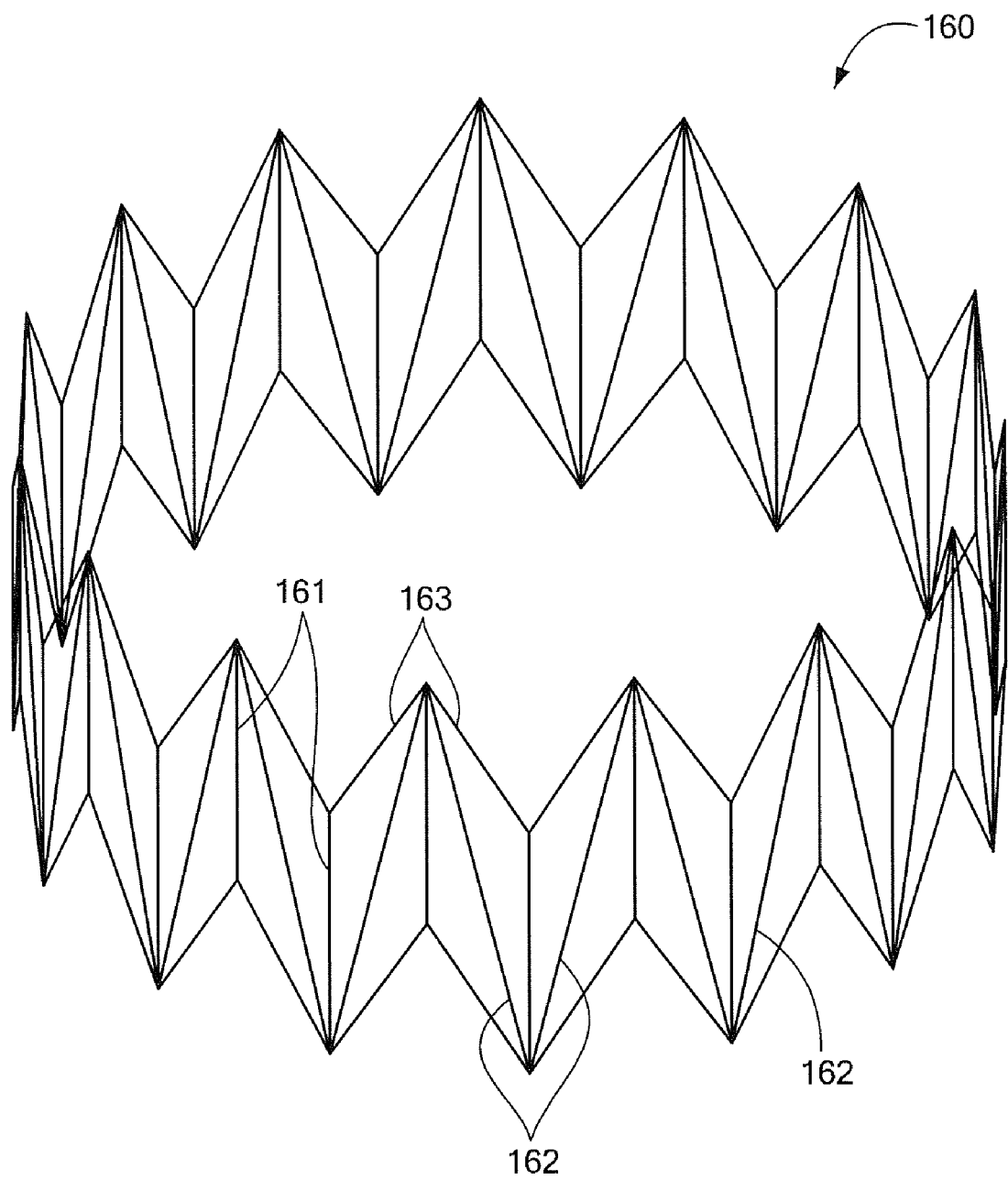
FIG. 6 is a view of a partially expanded truss of the satellite.
Figure 7:
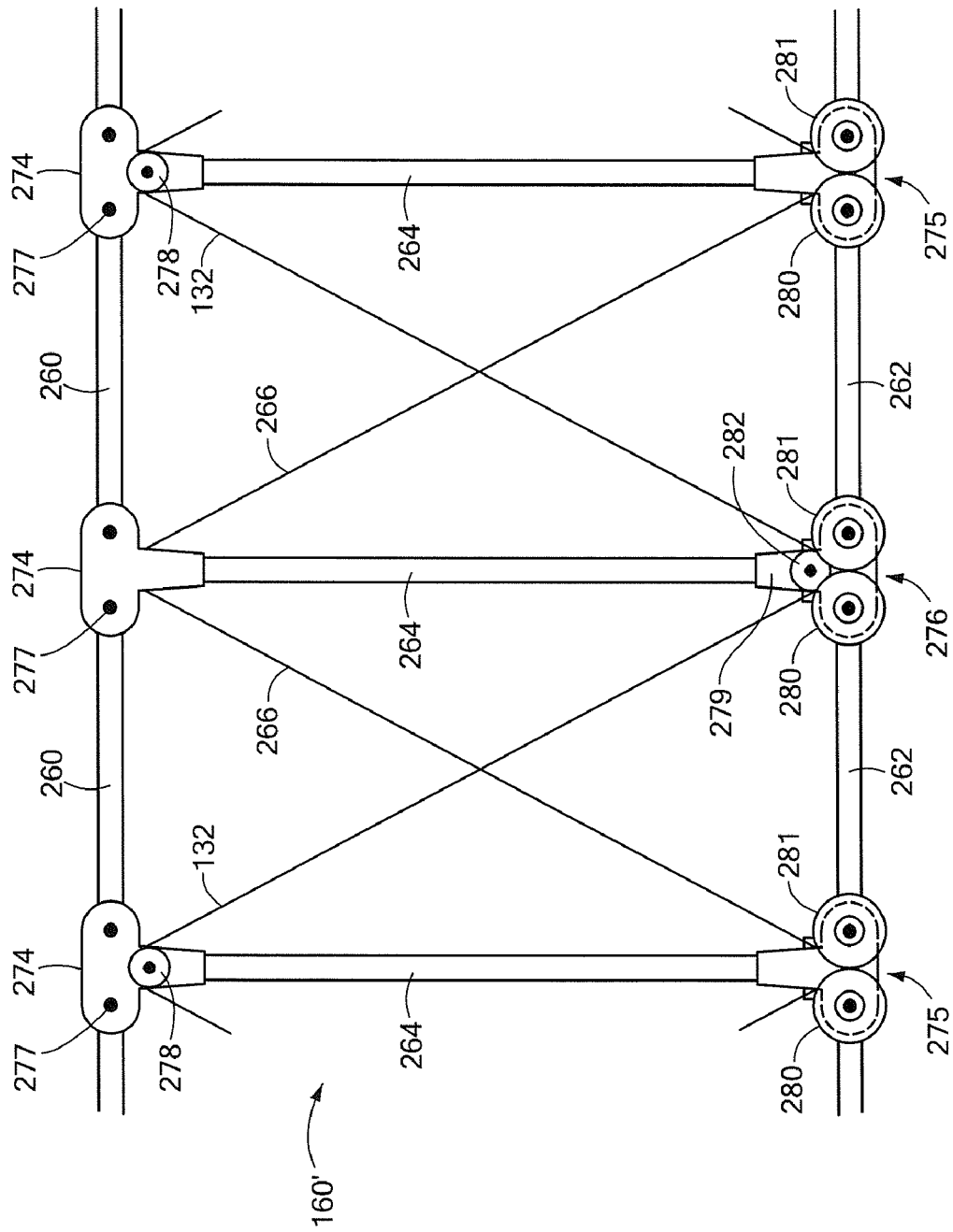
FIG. 7 is a view of an example a deployed truss.
Figure 8:
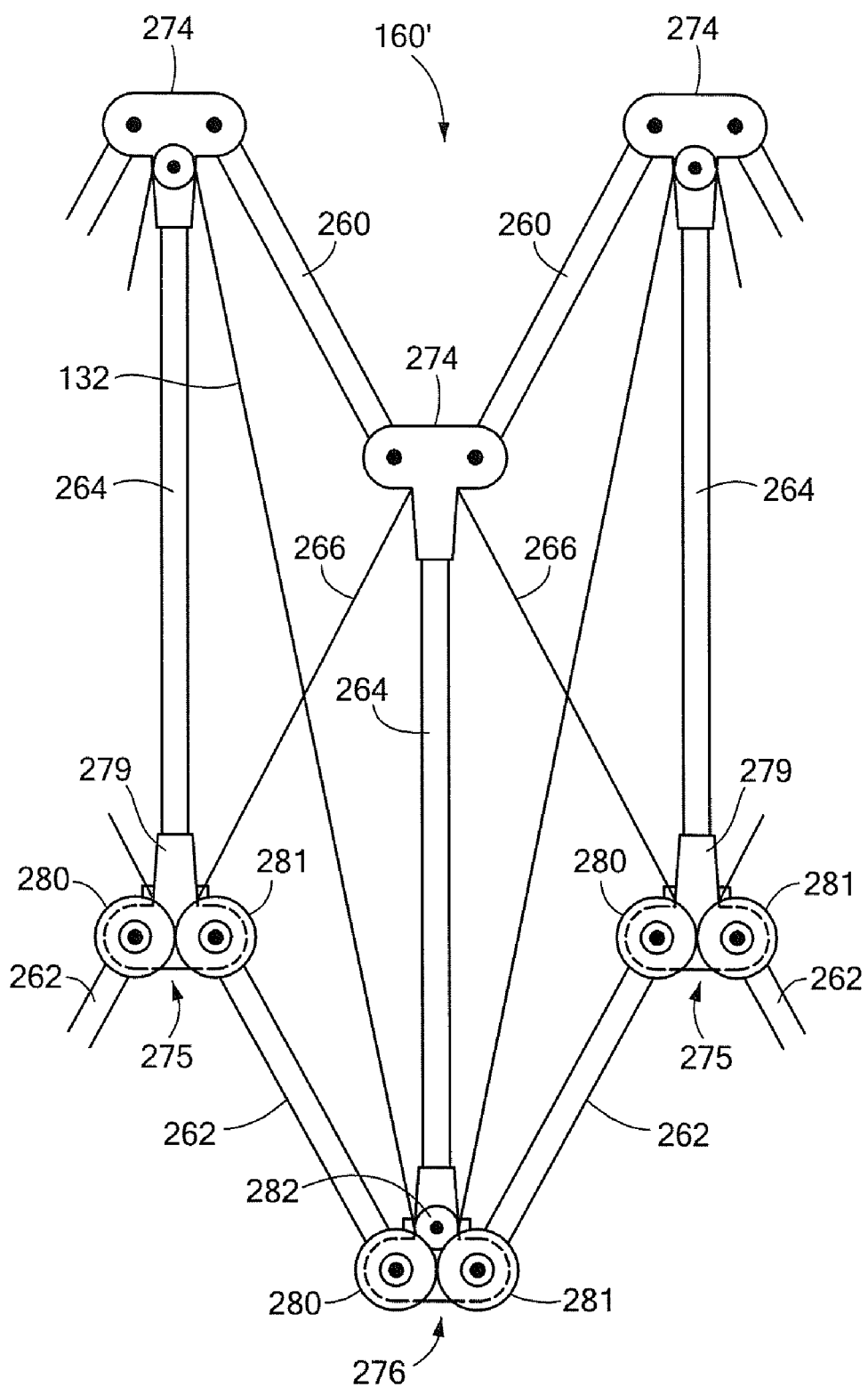
FIG. 8 is a view of a partially expanded truss of FIG. 7

Referring back to FIGS. 9 to 11, the antenna-aperture structure 12 includes an antenna mesh 150 (FIGS. 10 and 11) attached to a truss structure 160 (FIGS. 6 to 11). In one example, the antenna mesh 150 is a high-performance RF reflective antenna surface. FIGS. 2 to 4 show the antenna-aperture structure 12 in a stowed position much like a closed umbrella, for example. When the antenna-aperture structure 12 is radially expanded, the mesh 150 correspondingly opens up and is tensioned into a formed reflective shape, for example, like an umbrella opening up. FIG. 6 shows a partially expanded truss structure 160. FIGS. 9 to 11 show various views of a fully extended truss structure 160. Power, communications and other electrical connections amongst the equipment components 16a-16c are possible using cables (not shown) extending through the antenna aperture structure 12 and in particular the truss structure 160.

In one example, the truss structure 160 includes hinged vertical 161 and horizontal 163 sections with telescoping diagonal elements 162 (FIG. 6) forming a right triangle when deployed, a cable 132 (not shown in FIG. 6) looped through the diagonal elements 162 and fixed at one end and connected to a motorized drum 130 at the other end. In the stowed configuration, the vertical and horizontal elements 161, 163 are end-to-end and vertical with the diagonal element 162 at its maximum length connected at the endpoints of the vertical and horizontal section. The expansion of the truss structure 160 for deployment occurs with the drum rotates and the cable length is reduced, collapsing the length of the telescoping truss diagonals 162 and causing the truss structure 160 diameter to increase by rotating the horizontal section 163 to form a right triangle with the vertical and diagonal elements 161, 162. When fully expanded, the truss diagonals 162 are mechanically locked to form a rigid and strong structure that supports the equipment compartments 16a-16c and maintains the antenna mesh 150 within the truss structure 160. For example, as the truss structure 160 expands, the antenna mesh 150 is tensioned within the truss structure 160 to form a smooth reflective surface of the antenna mesh 150.

Referring to FIGS. 7 and 8, in one example, the antenna-aperture structure 12 is an antenna-aperture structure as described in U.S. Pat. No. 5,680,145 which is incorporated herein in its entirety. In FIG. 7 a portion of the truss is shown fully deployed and in FIG. 8 the truss is partially collapsed. The truss includes a series of upper bars 260 forming an upper ring, a series of lower bars 262 forming a lower ring, vertical struts 264 extending vertically between the upper and lower rings and diagonal struts 266 extending diagonally between the upper and lower rings. The upper bars 260, 262 include electrical, communications and power cables connecting the equipment components 16a-16c.

Two adjacent bars 260, 262 of each ring are pivotally connected to a respective vertical strut 264 by a connecting member 274, 275, or 276. Bars 260 are connected to the upper ends of vertical struts 264 by connecting members 274. Each connecting member 274 is fastened to a vertical strut 264 and carries two pivot pins 277 via which two adjacent bars 260 are pivotally connected to connecting member 274. Every other connecting member 274 further carries a freely rotatable pulley wheel 278 along the lower ring, connecting members 275 alternate with connecting members 276. Each of connecting members 275, 276 includes a support piece 279 on which two gear wheels 280 and 281 are rotatably mounted. Each gear wheel 280, 281 is fixed to a respective end of a respective bar 262 so that each bar 262 forms a rigid, unitary structure with one gear wheel 280 and one gear wheel 281. On each connecting member 275, 276, gear wheels 280 and 281 mesh with one another to rotate in unison but in respectively opposite sense.

Each connecting member 276 further includes a pulley 282 which is rotatably mounted on support piece 279. Each diagonal strut 266 extends between a connecting member 274 which does not carry a pulley wheel 278 and a connecting member 275. Each diagonal strut 266 may be a telescoping member, similar in structure to an automobile antenna except with a latch between segments, constructed to have good tensile strength.

The deployment cable 132 is looped alternating around pulley wheels 278 and 282 and thus follows a zigzag path around the periphery of the rim. One end of cable 132 is secured to the rim at any convenient point, such at a point 134 and the other end of cable 132 is secured to the motorized drum 130 for producing a deployment force. In other embodiments, the deployable cable 132 is included within the diagonal strut 266

Figure 12:
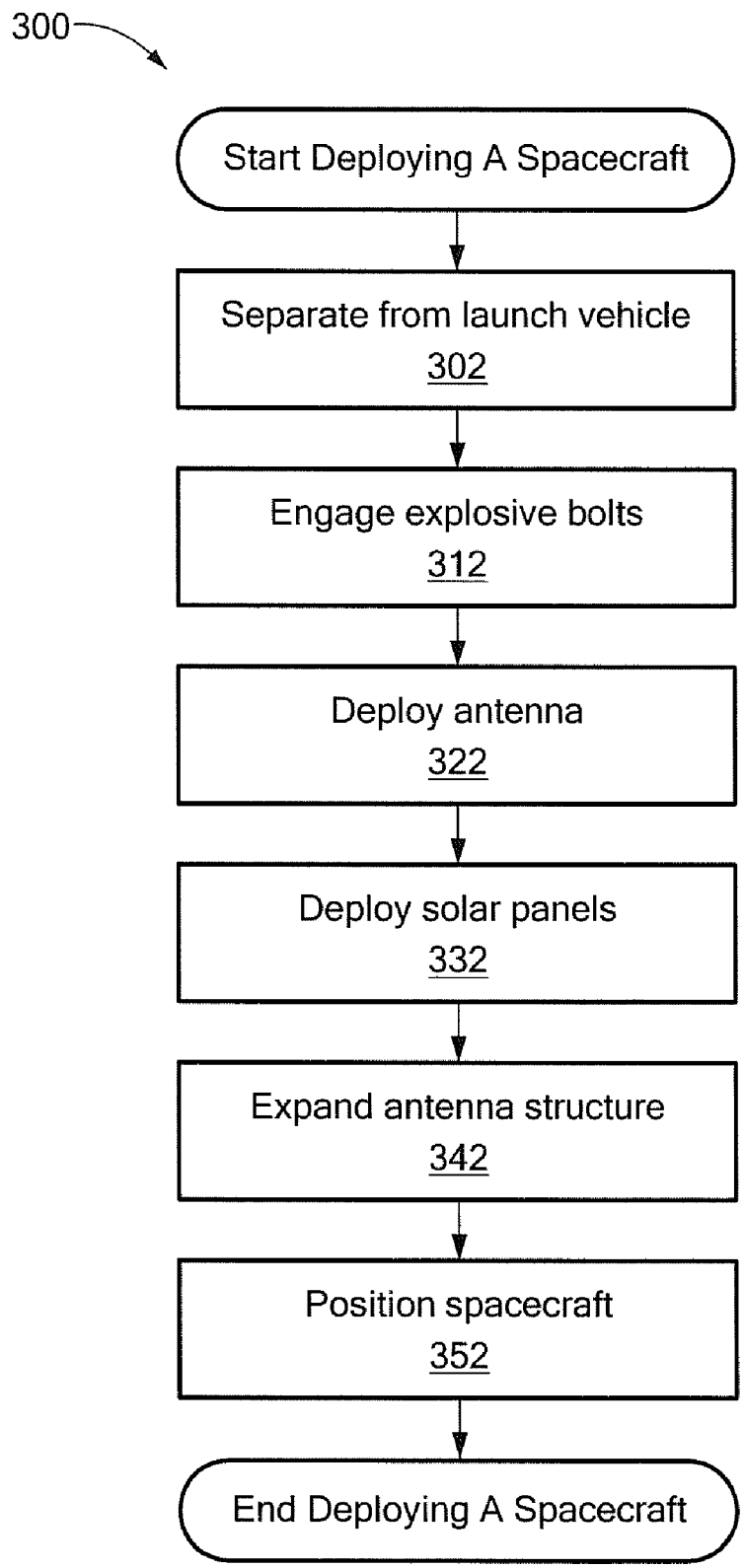
FIG. 12 is a flowchart of a process to deploy the satellite.

FIG. 12 shows an example of a process to deploy the satellite. After a launch vehicle reaches space, the fairing separates from the satellite 10 and launch vehicle. The satellite 10 then separates from the launch vehicle (302) and is an independent object. The explosive bolts 18 are engaged isolating each of the equipment compartments 16a-16c from one another (312). The antenna feed 140 is deployed in payload compartment 16 to provide clearance to the solar panels 122 (322). The solar panels 122 are deployed providing power for the expansion of the antenna-aperture structure 12 (332) and removing the satellite from internal battery power. The antenna-aperture structure 12 expands by receiving power from the power system 120 at the motorized drum 130 to rotate and tighten the cable 132 (342).

The spacecraft is oriented and maneuvered into position by the attitude determination and control system (352). For example, the ground control transmits TT&C signals to the antenna feed 140 to activate the command and data handling system to position the satellite 10 to a particular orbit location using the propulsion system 112.

The processes and systems described herein are not limited to the specific embodiments described herein. For example, process 300 is not limited to the specific processing order of FIG. 12. Rather, any of the blocks of FIG. 12 may be re-ordered, combined or removed, performed in parallel or in serial, as necessary, to achieve the results set forth above.

In other examples, satellite 10 may include solar sails to aid attitude control without requiring fuel. The solar sails may be attached to the solar panels 122 or to the payload compartments 16a-16c or both. Because of the large diameter, the solar sails require low force to provide significant rotational torque about the center of spacecraft 10 when deployed compared to traditional spacecraft.

In other examples, the satellite 10 may be a UHF satellite supporting a large number of channels requiring separate transmit and receive antennas. A separate receive antenna may be attached to one of the two equipment compartments 16a, 16b not containing the antenna feed 140. The receive antenna would connect to a receiver and a channelizer unit in the same equipment compartment. Processed signals may be routed to a transmitter in another equipment compartment for rebroadcast and may be performed with a high speed serial wired connection laced through the truss structure 160 or with a local wideband wireless link between the two payload compartments 16a-16b. In this example, the functionality of a UHF Follow-On class satellite may be supported.

In one example, the antenna mesh 150 may be replaced by an optical reflector mesh. In this example, the spacecraft 10 uses the optical reflector to reflect light. In another example, the antenna mesh 150 may be replaced by a light-shielding mesh. In this example, the spacecraft 10 using the light-shielding mesh may be used to provide shading to an orbiting space platform to shield exposed space platform components systems from the sun when a protective shielding panel is damaged.

In another example, the antenna mesh 150 may be replaced by a high strength woven fabric forming a closed net with the open end fastened at the truss structure (similar to a butterfly net). In this configuration with a 20-meter diameter open end, space debris could be gathered with minimal positioning and intercept accuracy to capture items that could be hazardous to other space systems. When the net is full, the satellite could be de-orbited in a controlled manner to burn up in the atmosphere and remove the hazard.

Elements of different embodiments described herein may be combined to form other embodiments not specifically set forth above. Other embodiments not specifically described herein are also within the scope of the following claims.

What is claimed is:

1. A space vehicle comprising:
   a structure being at least one of an antenna reflector mesh, a light-shielding mesh, an optical reflector mesh and a net and configured to radially expand from a first configuration to a second configuration, the structure being substantially in the center of the space vehicle in the first configuration; and
   equipment compartments disposed on the periphery of the structure.

2. The space vehicle of claim 1 wherein in the first configuration each of the equipment compartments are in contact with another of the equipment compartments.

3. The space vehicle of claim 1 wherein at least one of the equipment compartments comprises an antenna feed.

4. The space vehicle of claim 1 wherein at least one of the equipment compartments comprises a solar panel.

5. The space vehicle of claim 1 wherein at least one of the equipment compartments comprises a transceiver.

6. The space vehicle of claim 1 wherein at least one of the equipment compartments comprises a propulsion system.

7. The space vehicle of claim 6 wherein at least one of the equipment compartments comprises a fuel tank to power the propulsion system.

8. The space vehicle of claim 1 wherein at least one of the equipment compartments comprises an attitude control system.

9. The space vehicle of claim 1, further comprising cables connecting the at least two equipment compartments.

10. The space vehicle of claim 9 wherein the equipment compartments share power through cables.

11. The space vehicle of claim 9 wherein the equipment compartments communicate through the cables.

12. The space vehicle of claim 1 wherein the equipment compartments communicate wirelessly.

13. The space vehicle of claim 1 wherein the space vehicle is a satellite.

14. The space vehicle of claim 1 wherein the first configuration is used in stowing the space vehicle as a payload in a launch vehicle.

15. The space vehicle of claim 1 wherein the structure is substantially in the center of the space vehicle in the second configuration.

16. A space vehicle comprising:
   an antenna structure configured to radially expand from a first configuration to a second configuration, the antenna structure being substantially in the center of the space vehicle in the first configuration; and
   equipment compartments disposed on the periphery of the antenna structure, each of the at least two equipment compartments comprising a solar panel and a propulsion system and at least one of the at least two equipment compartments comprising an antenna feed.

17. The space vehicle of claim 16 wherein in the first configuration each of the equipment compartments is in contact with another of the equipment compartments.

18. The space vehicle of claim 16 wherein at least one of the equipment compartments comprises a transceiver.

19. The space vehicle of claim 16 wherein each of the equipment compartments comprises a fuel tank to power the propulsion system.

20. The space vehicle of claim 16 wherein at least one of the equipment compartments comprises an attitude control system.

21. The space vehicle of claim 16 wherein the space vehicle is a satellite.

22. The space vehicle of claim 16 wherein the first configuration is used in stowing the space vehicle as a payload in a launch vehicle.

23. The space vehicle of claim 16 wherein the structure is substantially in the center of the space vehicle in the second configuration.

24. The space vehicle of claim 16, further comprising cables connecting the at least two equipment compartments.

25. The space vehicle of claim 24 wherein the equipment compartments share power through cables and communicate through the cables.

26. A space vehicle comprising:
   a payload element being substantially in the center of the space vehicle and comprising an antenna-aperture structure configured to radially expand; and
   spacecraft-support structures disposed on the periphery of the payload element and forming the periphery of the space vehicle;
   at least one of the spacecraft-support structures comprising:
     a propulsion system; and
     a tracking, telemetry and control system.

27. The space vehicle of claim 26 wherein the space vehicle is a satellite.

28. The space vehicle of claim 26 wherein at least one of the spacecraft-support structures comprises an attitude control system.

* * * * *

UNITED STATES PATENT AND TRADEMARK OFFICE
CERTIFICATE OF CORRECTION

PATENT NO. : 7,686,255 B2  Page 1 of 1
APPLICATION NO. : 11/845825
DATED : March 30, 2010
INVENTOR(S) : Harris It is certified that error appears in the above-identified patent and that said Letters Patent is hereby corrected as shown below:

Col. 2, line 35, delete "example a" and replace with --example of a--.

Col. 2, line 46, delete "alt" and replace with --art--.

Col. 3, line 14, delete "a" and replace with --an--.

Col. 4, line 10, delete "also provides tracks the" and replace with --also tracks the--.

Col. 5, line 6, delete "with" and replace with --when--.

Col. 6, line 52, delete "components" and replace with --component--.

Signed and Sealed this

Twenty-fifth Day of May, 2010

David J. Kappos
*Director of the United States Patent and Trademark Office*